(12) United States Patent
Joo et al.

(10) Patent No.: US 7,369,690 B2
(45) Date of Patent: May 6, 2008

(54) APPARATUS FOR RECOGNIZING AN IMAGE

(75) Inventors: In-Soo Joo, Seongnam-si (KR); Joon-Hoo Choi, Seoul (KR); Sung-Hoon Yang, Seoul (KR); Beohm-Rock Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 744 days.

(21) Appl. No.: 10/660,750

(22) Filed: Sep. 12, 2003

(65) Prior Publication Data

US 2004/0213440 A1 Oct. 28, 2004

(30) Foreign Application Priority Data

Apr. 25, 2003 (KR) .................. 10-2003-0026247

(51) Int. Cl.
*G06K 9/00* (2006.01)
*G05B 19/00* (2006.01)

(52) U.S. Cl. ............... 382/124; 340/5.53; 713/186
(58) Field of Classification Search ........ 382/115–127; 340/5.1, 5.2, 5.52, 5.53; 356/71; 713/186; 902/3

See application file for complete search history.

(56) References Cited

U.S. PATENT DOCUMENTS

| | | | | |
|---|---|---|---|---|
| 4,358,677 A | * | 11/1982 | Ruell et al. ............... 250/216 |
| 5,088,817 A | * | 2/1992 | Igaki et al. .................. 356/71 |
| 5,103,486 A | * | 4/1992 | Grippi ....................... 382/116 |
| 5,594,806 A | * | 1/1997 | Colbert ...................... 382/115 |
| 5,635,723 A | * | 6/1997 | Fujieda et al. ............. 250/556 |
| 5,719,950 A | * | 2/1998 | Osten et al. ................ 382/115 |
| 5,953,441 A | * | 9/1999 | Setlak ........................ 340/5.83 |
| 5,991,467 A | * | 11/1999 | Kamiko ..................... 382/312 |
| 6,002,786 A | * | 12/1999 | Hallibert et al. ............ 382/124 |
| 6,144,757 A | * | 11/2000 | Fukuzumi ................... 382/124 |
| 6,181,808 B1 | * | 1/2001 | Fukuzumi ................... 382/126 |
| 6,314,195 B1 | * | 11/2001 | Fukuzumi ................... 382/115 |
| 6,392,636 B1 | * | 5/2002 | Ferrari et al. .............. 345/173 |
| 6,501,284 B1 | * | 12/2002 | Gozzini ...................... 324/681 |
| 6,647,133 B1 | * | 11/2003 | Morita et al. .............. 382/124 |
| 6,665,428 B1 | * | 12/2003 | Gozzini ...................... 382/124 |
| 6,668,071 B1 | * | 12/2003 | Minkin et al. ............. 382/124 |
| 6,871,242 B1 | * | 3/2005 | Ho-Lung et al. ............. 710/16 |
| 6,888,956 B2 | * | 5/2005 | Muramatsu et al. ........ 382/124 |
| 6,960,788 B2 | * | 11/2005 | Joo et al. ..................... 257/59 |
| 7,123,755 B2 | * | 10/2006 | Shigeta ....................... 382/124 |
| 2002/0018585 A1 | * | 2/2002 | Kim ........................... 382/125 |
| 2002/0076089 A1 | * | 6/2002 | Muramatsu et al. ........ 382/124 |
| 2003/0072475 A1 | * | 4/2003 | Tamori ....................... 382/124 |
| 2003/0147550 A1 | * | 8/2003 | Shigeta ....................... 382/124 |

(Continued)

*Primary Examiner*—Aaron W Carter
(74) *Attorney, Agent, or Firm*—Cantor Colburn LLP

(57) ABSTRACT

In a fingerprint recognition apparatus, a first recognition section is formed on a center portion of a transparent substrate and a second recognition section is formed on the transparent substrate adjacent to the first recognition section. The first recognition section recognizes an image pattern from an object making contact with the transparent substrate to generate a first recognition signal and the second recognition section senses a biological signal so as to check whether or not the first recognition signal is obtained from a human being. Accordingly, the fingerprint recognition apparatus may check that whether or not the object having the image pattern is obtained from a human being, thereby recognizing the image pattern with high accuracy and improving reliability thereof.

22 Claims, 10 Drawing Sheets

U.S. PATENT DOCUMENTS

2004/0071322 A1* 4/2004 Choshi et al. .............. 382/115
2006/0034492 A1* 2/2006 Siegel et al. ................ 382/115
2006/0204062 A1* 9/2006 Shigeta ....................... 382/124

* cited by examiner

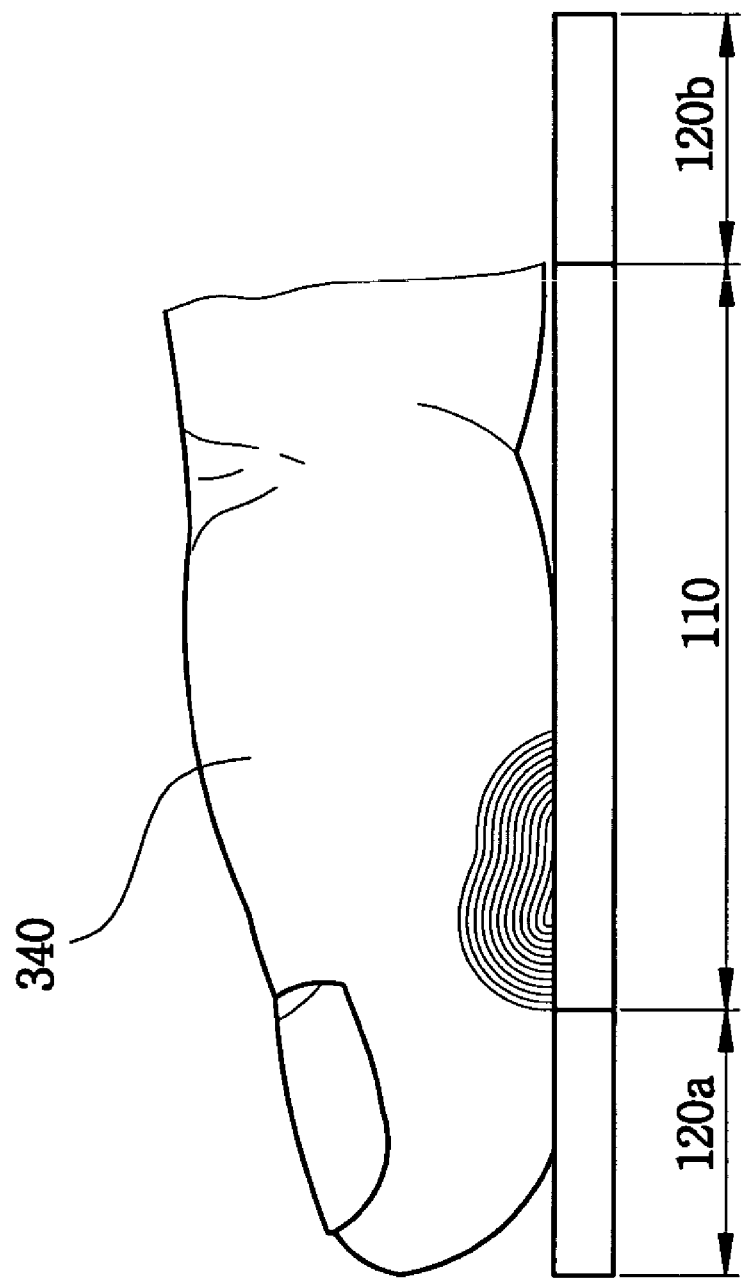

APPARATUS FOR RECOGNIZING AN IMAGE

CROSS-REFERENCE TO RELATED APPLICATION

This application relies for priority upon Korean Patent Application No. 2003-26247 filed on Apr. 25, 2003, the contents of which are herein incorporated by reference in its entirety.

BACKGROUND OF THE INVENTION

1. Field of the Invention

The present invention relates to an apparatus for recognizing an image, and more particularly to an apparatus for recognizing an image, capable of recognizing an image pattern from a human being with high accuracy.

2. Description of the Related Art

An amorphous-silicon thin film transistor liquid crystal display apparatus (a-Si TFT-LCD apparatus), which is a kind of flat panel display, is widely applied to an electronic instrument, for example, such as a notebook computer, a monitor, a television set, a mobile communication system, a hand-held electronic appliance and so on.

Also, since the a-Si TFT-LCD, generally, includes a photosensitive material that is chemically changeable in response to a light, the a-Si TFT-LCD may be broadly used to biometrics industries as a photoelectric sensor.

The biometrics industries relate to a personal verification system using inherent biological properties, for example, such as a fingerprint, a voice, a facial feature, a hand or an eye iris. In view of cost, convenience and accuracy, a personal verification system using the fingerprint among the inherent biological properties is widely used.

A conventional fingerprint recognition apparatus includes a photoelectric sensor, for example, such as a sensing TFT, a switching TFT, a storage capacitor, or the like.

An operation mechanism for carrying out recognition of the fingerprint recognition apparatus using the photoelectric sensor is as follows.

The sensing TFT receives a light emitted from a light source and reflected corresponding to a fingerprint image printed on a human finger. When the sensing TFT is turned on in response to the light, the storage capacitor charges an electron charge in proportion to an amount of the light received into the sensing TFT. The amount of the light received into the sensing TFT may be different according to a position from which the light is reflected because a reflectance between a light reflected from a ridge portion that is protruded portion of the human finger and a light reflected from a valley portion that is recessed portion of the human finger is different from each other. Thus, the amount of the electron charge charged into the sensing TFT may be varied due to the amount of the reflected light from the fingerprint image.

The switching TFT reads out the amount of the electron charge charged into the storage capacitor and outputs a signal corresponding to the amount of the electron charge through a sensing signal output line to an external.

As described above, the conventional fingerprint recognition apparatus may recognize the fingerprint image based on the reflected light from the fingerprint image of the human finger while the human finger does not directly make contact with the fingerprint recognition apparatus. Also, even if an object having the fingerprint image is not the human finger, the conventional fingerprint recognition apparatus recognizes the fingerprint image as a biological signal, for example, such as the fingerprint of the human finger, when the object makes contact with the fingerprint recognition apparatus.

That is, although the fingerprint image printed on an object, for example, such as a paper or the like, makes contact with the fingerprint recognition apparatus, the fingerprint recognition apparatus recognizes the fingerprint image printed on the object as a normal biological signal from the human finger. As a result, an accuracy of the fingerprint recognition apparatus for verifying a normal user may be lowered.

BRIEF SUMMARY OF THE INVENTION

The present invention provides an image recognizing apparatus capable of recognizing an image with high accuracy.

In one aspect of the invention, an image recognizing apparatus includes a transparent substrate, a first recognition section disposed on the transparent substrate, and a second recognition section disposed on the transparent substrate adjacent to the first recognition section.

The first recognition section receives an image pattern from an object and generates a first recognition signal corresponding to the received image pattern, and the second recognition section senses a biological signal from the object so as to check whether or not the first recognition signal is obtained from a human being.

The first recognition section may include an image recognition sensor for generating the first recognition signal corresponding to an amount of a reflecting light reflected from the image pattern. The amount of the reflecting light may be differently reflected according to a position from which the reflecting light is reflected.

The second recognition section may include a capacitance type biological-signal recognition sensor operated as a capacitor with the object having the image pattern.

The image pattern of the object may include a fingerprint image obtained from the human being, and the object may generally and directly makes contact with the transparent substrate.

In another aspect of the invention, an image recognizing apparatus includes a plurality of sensing signal output line disposed on a transparent substrate, extended in a first direction and arranged in a second direction substantially perpendicular to the first direction, a plurality of gate line disposed on the transparent substrate, extended in the second direction and arranged in the first direction, a plurality of pixel areas defined by two sensing signal output lines adjacent to each other and two gate lines adjacent to each other, a first recognition section formed on the pixel areas positioned at a center portion of the transparent substrate, a bias line extended in the first direction, arranged in the second direction and adjacent to the sensing signal output lines, a gate-off line extended in the second direction, arranged in the first direction and adjacent to the gate lines, and a second recognition section formed on the pixel areas adjacent to the first recognition section.

The first recognition section receives an image pattern from an object that makes contact with the transparent substrate and generates a first recognition signal and the bias line applies a predetermined voltage to the first recognition section. The gate-off line outputs a gate-off signal to the first recognition section and the second recognition section senses a biological signal from the object so as to check whether or not the first recognition signal is obtained from a human being.

The image pattern of the object may comprise a fingerprint image obtained from the human being, and the object may generally and directly makes contact with the transparent substrate.

Accordingly, the image recognition apparatus may check that whether or not the image pattern, for example, such as a fingerprint image, is obtained from the human being, thereby recognizing the image pattern with high accuracy and improving reliability thereof.

BRIEF DESCRIPTION OF THE DRAWINGS

The above and other advantages of the present invention will become readily apparent by reference to the following detailed description when considered in conjunction with the accompanying drawings wherein:

FIG. 6 is a schematic view illustrating operations for recognition of fingerprint image and biological-signal between the human finger and fingerprint recognition apparatus;

DETAILED DESCRIPTION OF THE INVENTION

Hereinafter, an apparatus for recognizing an image pattern, for example, such as a fingerprint image from an object, will be described.

Particularly, in this exemplary embodiment, a fingerprint recognition apparatus that recognizes an image pattern, for example, such as the fingerprint image from a human being, will be described. That is, the object having the image pattern may comprise at least the fingerprint image of the human being.

Figure 1:
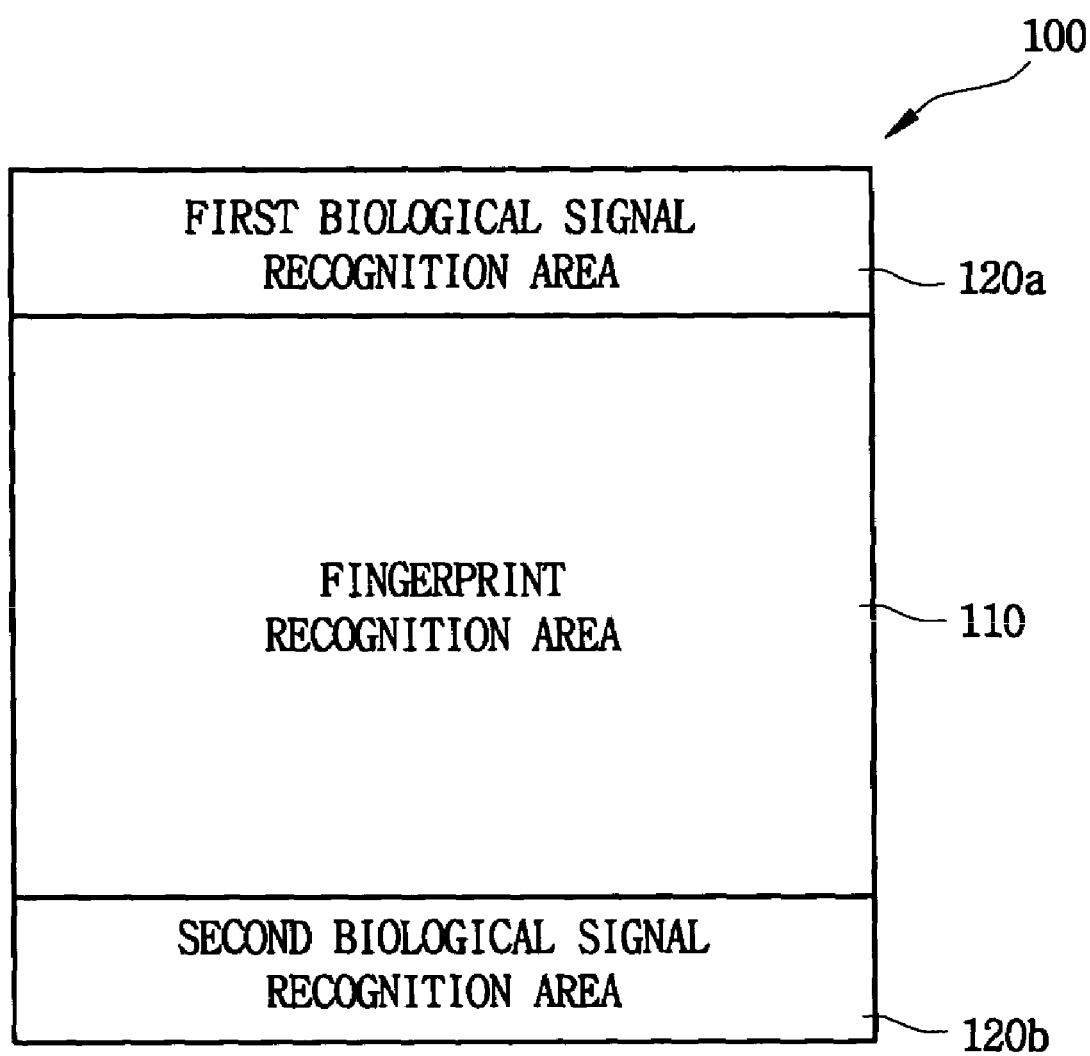
FIG. 1 is a schematic view showing a fingerprint recognition apparatus according to an exemplary embodiment of the present invention.
Figure 2:
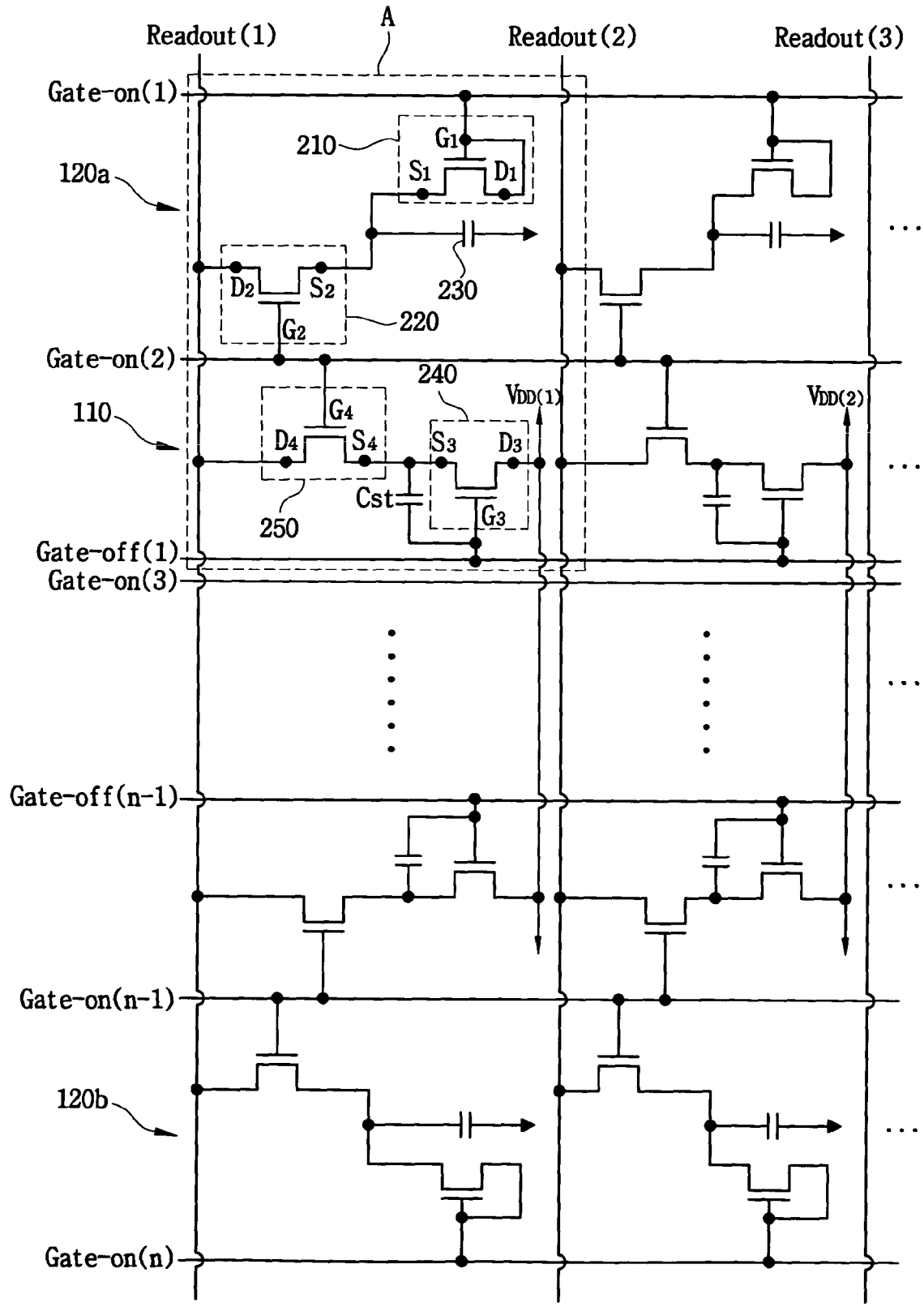
FIG. 2 is a circuit diagram showing the fingerprint recognition apparatus shown in FIG. 1.

FIG. 1 is a schematic view showing a fingerprint recognition apparatus according to an exemplary embodiment of the present invention. FIG. 2 is a circuit diagram showing the fingerprint recognition apparatus shown in FIG. 1.

Referring to FIG. 1, a fingerprint recognition apparatus 100 includes a fingerprint recognition area 110 for receiving a fingerprint image from the object and generating a fingerprint recognition signal corresponding to the fingerprint image, a first biological-signal recognition area 120a and a second biological-signal recognition area 120b for sensing a biological signal from the object so as to check that whether or not the fingerprint recognition signal generated from the fingerprint recognition area 110 is obtained from the human being.

The fingerprint recognition area 110 is formed on a center portion of the fingerprint recognition apparatus 100 and the first and second biological-signal recognition areas 120a and 120b are formed on a peripheral portion of the fingerprint recognition apparatus 100. That is, the first and second biological-signal recognition areas 120a and 120b are formed adjacent to a first end of the fingerprint recognition apparatus 100 and a second end opposite to the first end thereof, respectively.

When the first and second biological-signal recognition areas 120a and 120b are disposed on the first and second ends, respectively, a fingerprint image recognized through the fingerprint recognition area 110 may be normally verified by means of the first and second biological-signal recognition areas 120a and 120b.

Also, by disposing the first and second biological-signal recognition areas 120a and 120b as shown in FIG. 1, the biological signal, which is representing that whether or not the object having the fingerprint image is human being, may be easily sensed through one of the first and second biological-signal recognition areas 120a and 120b although a human finger of the human being makes contact with the fingerprint recognition area 110.

The fingerprint recognition area 110 includes a plurality of fingerprint recognition sensors that recognizes the fingerprint image using a photocurrent, and the first and second biological-signal recognition areas 120a and 120b include a plurality of biological-signal recognition sensors that senses the biological signal from the object using a capacitance.

Referring to FIG. 2, the biological-signal recognition sensor having a first TFT 210, a second TFT 220 and a conductive sensing electrode 230 is formed on the first biological-signal recognition area 120a in a matrix configuration. The conductive sensing electrode 230 acts as a capacitor with the human finger that makes contact with an upper surface of the fingerprint recognition apparatus 100. That is, the conductive sensing electrode 230 and human finger act as a lower electrode and a upper electrode of the capacitor, respectively.

Source electrodes S1 and S2 of the first and second TFTs 210 and 220 are electrically connected to each other by means of the conductive sensing electrode 230. The first TFT 210 includes a gate electrode G1 connected to a first gate-on line Gate_on (1) and a drain electrode D1 commonly connected to the first gate-on line Gate_on (1) with the gate electrode G1 thereof. The second TFT 220 includes a gate electrode G2 connected to a second gate-on line Gate_on (2) and a drain electrode D2 connected to a first sensing signal output line Readout(1).

The fingerprint recognition sensor having a third TFT 240, a fourth TFT 250 and a storage capacitor Cst is formed on the fingerprint recognition area 110 in a matrix configuration. The third and fourth TFTs 240 and 250 are operated as a sensing TFT and a switching TFT, respectively.

As shown in FIG. 2, the second biological-signal recognition area 120b includes same elements and function as in those of the first biological-signal recognition area 120a, and thus the detailed descriptions of the same elements will be omitted.

The third TFT 240 includes a drain electrode D3 connected to a first power line $V_{DD}1$, a source electrode S3 connected to the storage capacitor Cst and a gate electrode G3 connected to a first gate-off line Gate_off (1). The fourth TFT 250 includes a source electrode S4 commonly connected to the storage capacitor Cst with the source electrode S3 of the third TFT 240, a drain electrode D4 connected to the first sensing signal output line Readout (1) and a gate electrode G4 connected to the second gate-on line Gate_on (2).

The biological-signal recognition sensor formed on the first biological-signal recognition area 120a is connected to the first and second gate-on lines Gate_on (1) and Gate_on (2) positioned at a first end of the fingerprint recognition apparatus 100. Also, the biological-signal recognition sensor formed on the second biological-signal recognition area 120b is connected to the Nth and (N-1)-th gate-on lines Gate_on (N) and Gate_on (N-1) positioned at a second end of the fingerprint recognition apparatus 100.

In FIG. 2, the biological-signal recognition sensor formed in one row at the first and second ends of the fingerprint recognition area 110, respectively, has been described. However, the biological-signal recognition sensor may be formed in a plurality of rows at the first and second ends thereof.

Figure 3:
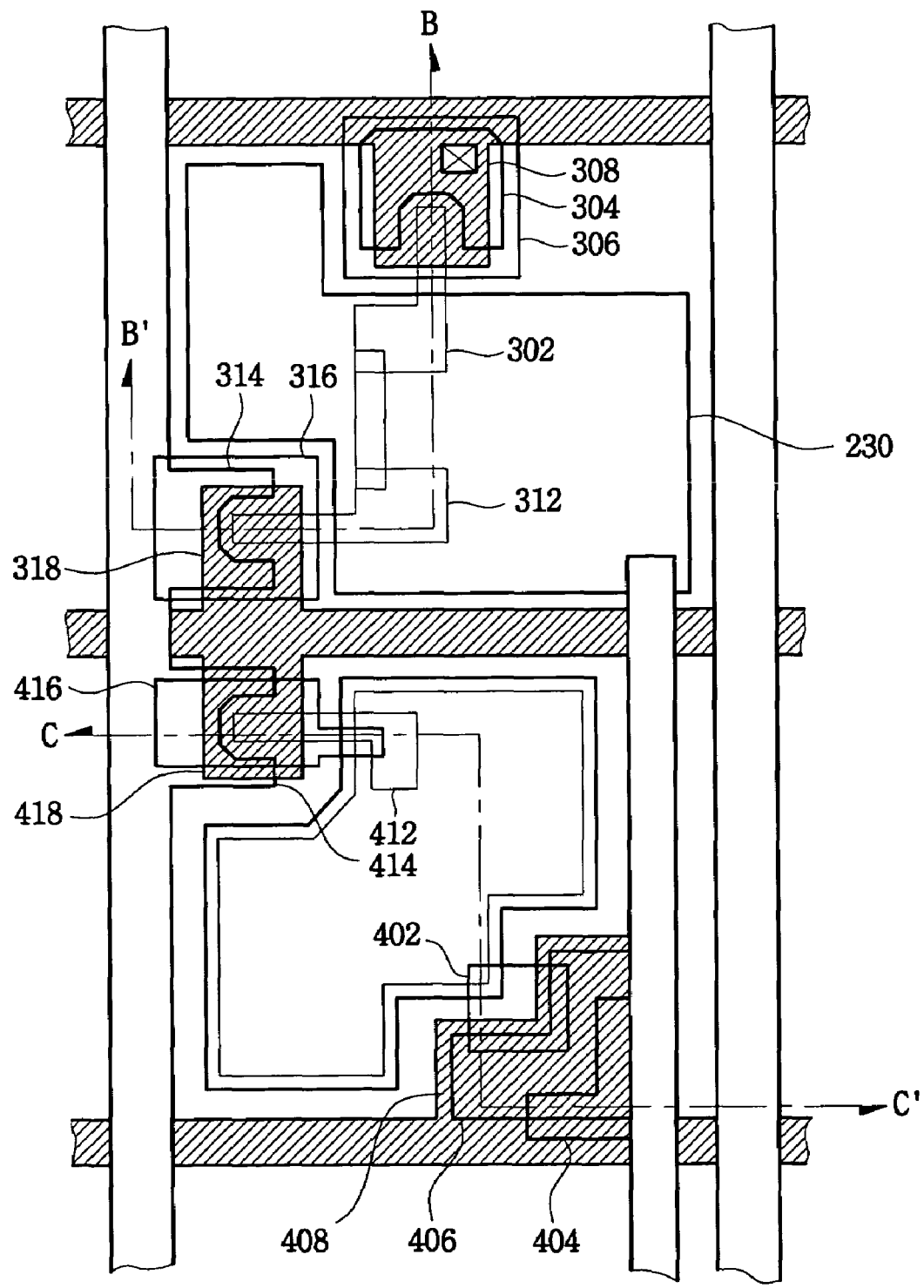
FIG. 3 is a schematic view showing a portion "A" shown in FIG. 2.
Figure 4:
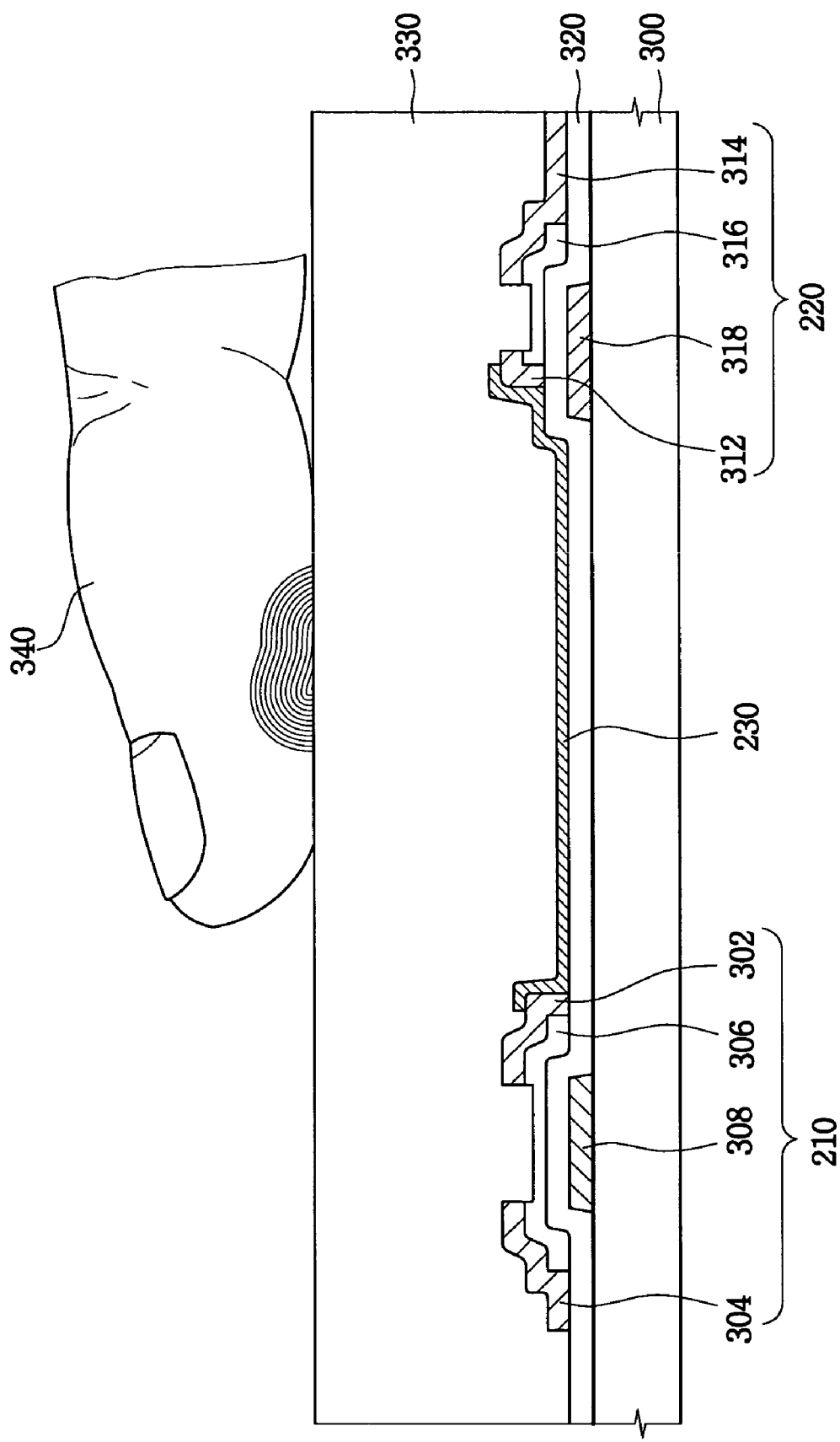
FIG. 4 is a cross-sectional view taken along the line B-B' for showing the fingerprint recognition apparatus shown in FIG. 3.
Figure 5:
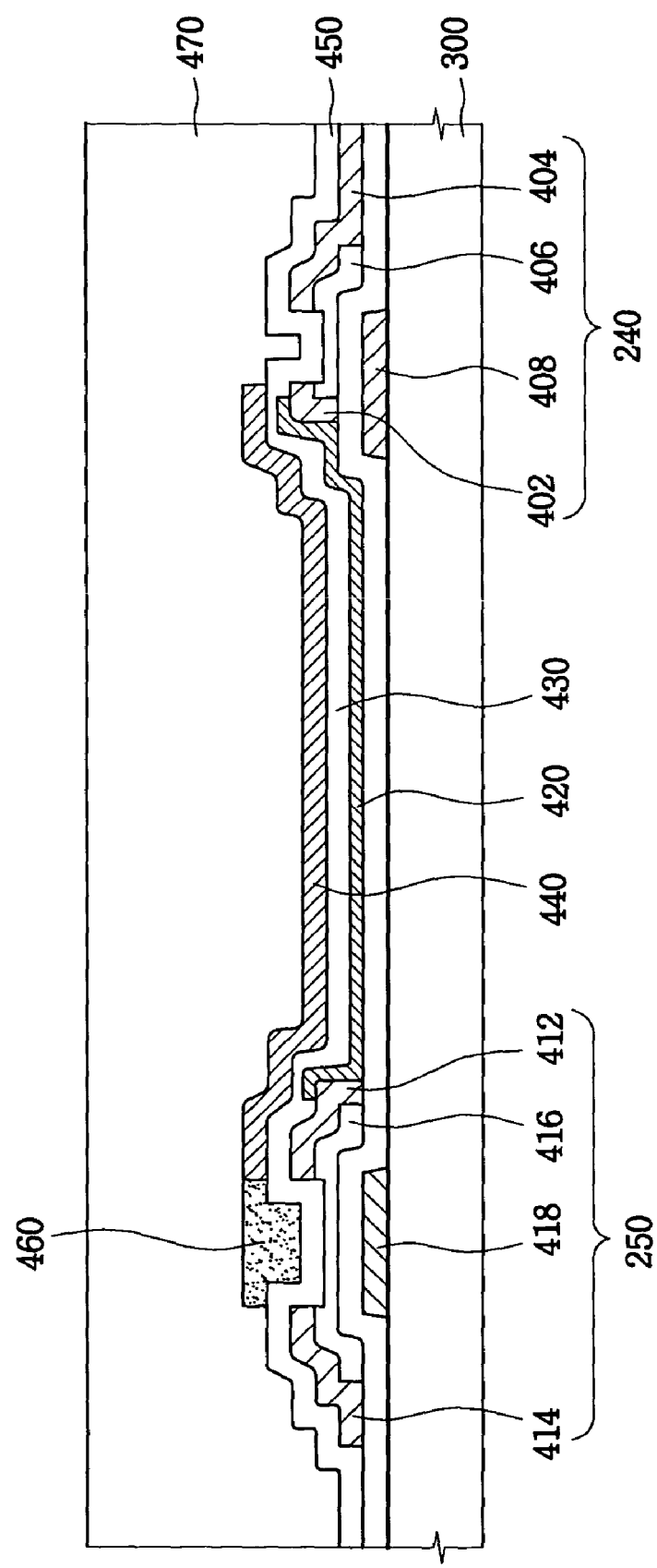
FIG. 5 is a cross-sectional view taken along the line C-C' for showing the fingerprint recognition apparatus shown in FIG. 3.

FIG. 3 is a schematic view showing a portion "A" shown in FIG. 2. FIG. 4 is a cross-sectional view taken along the line B-B' for showing the fingerprint recognition apparatus shown in FIG. 3. FIG. 5 is a cross-sectional view taken along the line C-C' for showing the fingerprint recognition apparatus shown in FIG. 3. FIG. 6 is a schematic view illustrating operations for recognition of fingerprint image and biological-signal between the human finger and fingerprint recognition apparatus.

Referring to FIGS. 3 and 4, the first TFT 210 includes a first channel area 306 formed between the source and drain electrodes 302 and 304 and the second TFT 220 includes a second channel area 316 formed between the source and drain electrodes 312 and 314. The first and second channel areas 306 and 316 have an a-Si. In order to insulate the source electrodes 302 and 312 and the drain electrodes 304 and 314, a gate insulating layer 320 is formed over the transparent substrate 300 on which the gate electrodes 308 and 318 of the first and second TFTs 210 and 220 are formed.

The conductive sensing electrode 230 is formed on the gate insulating layer 320 so as to electrically connect the source electrode of the first TFT 210 and the source electrode 312 of the second TFT 220. A protecting layer 330 is formed over the transparent substrate 300 on which the conductive sensing electrode 230 and the first and second TFTs 210 and 220 are formed. Thus, in case that the human finger 340 makes contact with an upper surface of the biological-signal recognition sensor, the conductive sensing electrode 230 and human finger 340 may act as the lower electrode and upper electrode of the capacitor, respectively, with the protecting layer 330 formed between the conductive sensing electrode 230 and the human finger 340. That is, an electron charge is charged between the conductive sensing electrode 230 and human finger 340 corresponding to a voltage applied through the first TFT 210.

In the biological-signal recognition sensor, the first TFT 210 is turned on in response to a gate-on signal input through the first gate-on line Gate_on (1) to apply a voltage corresponding to the gate-on signal to the conductive sensing electrode 230. The capacitor using the conductive sensing electrode 230 and human finger 340 charges the electron charge corresponding to the voltage provided from the first TFT 210. The second TFT 220 is turned on in response to a gate-on signal input through the second gate-on line Gate_on (2) to output a voltage signal through the first sensing signal output line Readout (1), which is corresponding to the electron charge charged between the conductive sensing electrode 230 and human finger 340. The voltage signal output from the first sensing signal output line Readout (1) is a biological-signal sensing signal.

As shown in FIGS. 3 and 5, the third TFT 240 includes a third channel area 406 formed between the source and drain electrodes 402 and 404 thereof and the fourth TFT 250 includes a fourth channel area 416 formed between the source and drain electrodes 412 and 414 thereof. The third and fourth channel areas 406 and 416 have the a-Si. When a light having a predetermined amount is supplied to the third channel area 406, the third channel area 406 formed between the source and drain electrodes 402 and 404 of the third TFT 240 is electrically turned on.

The source electrode 402 of the third TFT 240 is electrically connected to the source electrode 412 of the fourth TFT 250 by means of a first electrode 420 operated as the lower electrode of the storage capacitor Cst. An insulating layer 430 is formed over the transparent substrate 300 on which the first electrode 420 is formed. A second electrode 440 operated as the upper electrode of the storage capacitor Cst is formed on the insulating layer 430 corresponding to the first electrode 420. That is, the storage capacitor Cst includes the first electrode 420, second electrode 440 and insulating layer 430 and charges the electron charge in proportion to an amount of the light supplied to the third TFT 240.

In order to insulate the source electrodes 402 and 412 and drain electrodes 404 and 414 of the third and fourth TFTs 240 and 250, a gate insulating layer 450 is formed on the gate electrodes 408 and 418 of the third and fourth TFTs 240 and 250. A shielding layer 460 is formed on the source and drain electrodes 412 and 414 of the fourth TFT 250 so as to shield the light, which is incident thereon. A protecting layer 470 is formed over the transparent substrate 300 on which the shielding layer 460 is formed.

When a reflecting light reflected from the fingerprint image of the human finger 340 that makes contact with the fingerprint recognition apparatus 100 is supplied to the third channel area 406 of the third TFT 240, the third TFT 240 is turned on. The third TFT 240 applies to a voltage signal to the storage capacitor Cst, which is corresponding to the reflecting light supplied to the third channel area 406 of the third TFT 240.

The fingerprint image includes a raised ridge portion and a recessed valley portion having a light reflectance different to each other. Thus, the voltage signal applied from the third TFT 240 to the storage capacitor Cst has a different level each other in accordance with the raised ridge portion and the recessed valley portion.

The storage capacitor Cst charges the electron charge corresponding to the voltage signal output from the third TFT 240. The fourth TFT 250 is turned on in response to the gate-on signal output through the second gate-on line Gate_on (2) and outputs a voltage signal corresponding to the electron charge charged into the storage capacitor Cst through the first sensing signal output line Readout (1). The voltage signal output from the first sensing signal output line Readout (1) is a fingerprint image signal.

Hereinafter, the fingerprint recognition apparatus according to the exemplary embodiment of the present invention will be described.

The drain electrode 404 of the third TFT 240 receives a direct current voltage $V_{DD}$ having a predetermined voltage level and gate electrode 408 thereof receives a predetermined bias voltage.

The fourth TFT 250 is switched in response to a gate driving signal generated from a gate driving section (not shown) and applied through the gate electrode 418 connected to the second gate-on line Gate_on (2). In order to switch the fourth TFT 250, the gate driving section (not shown) outputs the gate driving signal corresponding to every frame for scanning the fingerprint image. Thus, the fingerprint image of the human finger 340 that makes contact with the fingerprint recognition apparatus 100 may be scanned corresponding to every frame of the fingerprint recognition sensors arranged in a matrix configuration.

The drain electrode 414 of the fourth TFT 250 is connected to an amplifying section (not shown) of a data reading-out section (not shown) through the first sensing signal output line Readout (1). When the fourth TFT 250 is turned on, the voltage signal in proportion to the electron charge charged into the storage capacitor Cst is outputted through the first sensing signal output line Readout (1) as a first recognition signal (hereinafter, referred to as a fingerprint recognition signal).

The first TFT 210 of the first biological-signal recognition area 120a is switched in response to the gate-on signal applied from the gate driving section (not shown) and applies a voltage signal corresponding to the gate-on signal to the conductive sensing electrode 230. The gate-on signal from the gate driving section is applied to the first TFT 210 through the gate electrode 308 connected to the first gate-on line Gate_on (1).

The conductive sensing electrode 230, as shown in FIG. 6, acts as the capacitor with the human finger 340 that partially makes contact with the first biological-signal recognition area 120a and charges the electron charge corresponding to the voltage signal from the first TFT 210. The second TFT 220 is switched in response to the gate-on signal applied from the gate driving section (not shown) and outputs a voltage signal corresponding to the electron charge charged into the conductive sensing electrode 230 through the first sensing signal output line Readout (1). The gate-on signal from the gate driving section is applied to the second TFT 220 through the gate electrode 318 connected to the second gate-on line Gate_on (2).

As described above, when the biological-signal sensing signal is outputted from the biological-signal recognition sensor, the fingerprint recognition apparatus 100 may check that whether or not the fingerprint recognition signal recognized by the fingerprint recognition sensor is obtained from the human finger 340 of the human being.

As a result of the check, if the biological-signal sensing signal is not outputted from the biological-signal recognition sensor 200, the fingerprint recognition apparatus 100 may judge that the fingerprint recognition signal recognized by the fingerprint recognition sensor is not obtained from the human being.

Hereinafter, a method of fabricating the fingerprint recognition apparatus according to an exemplary embodiment of the present invention will be described with reference to accompanying drawings.

Figure 7A:
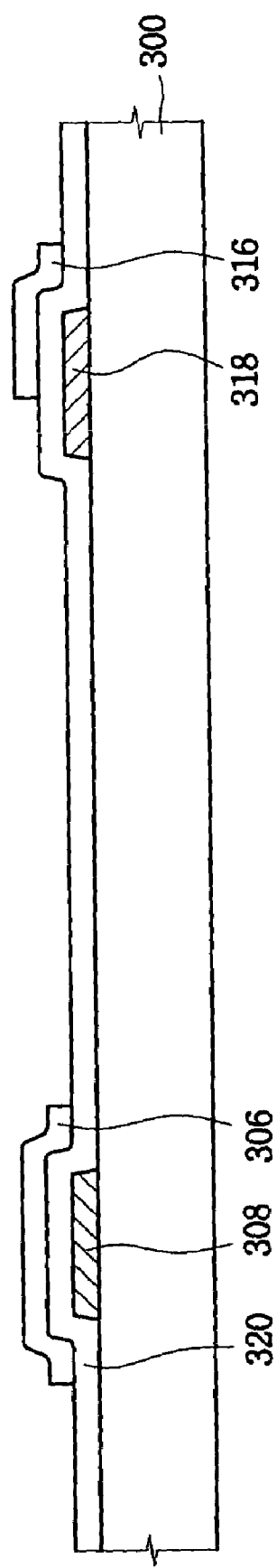
FIGS. 7A to 7C are views illustrating a method of fabricating a biological-signal recognition sensor of a fingerprint recognition apparatus according to an exemplary embodiment of the present invention.
Figure 7B:
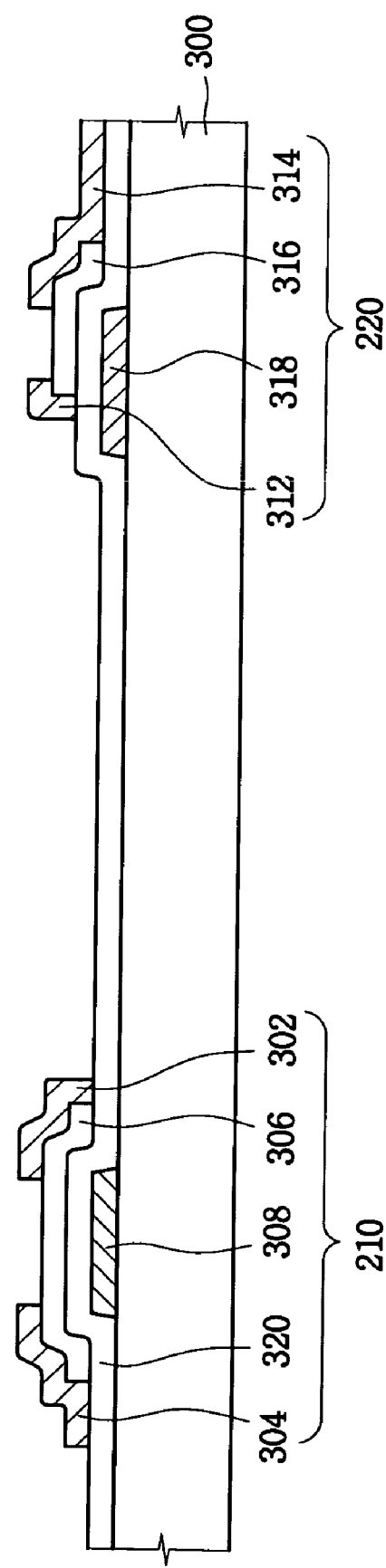
Figure 7C:
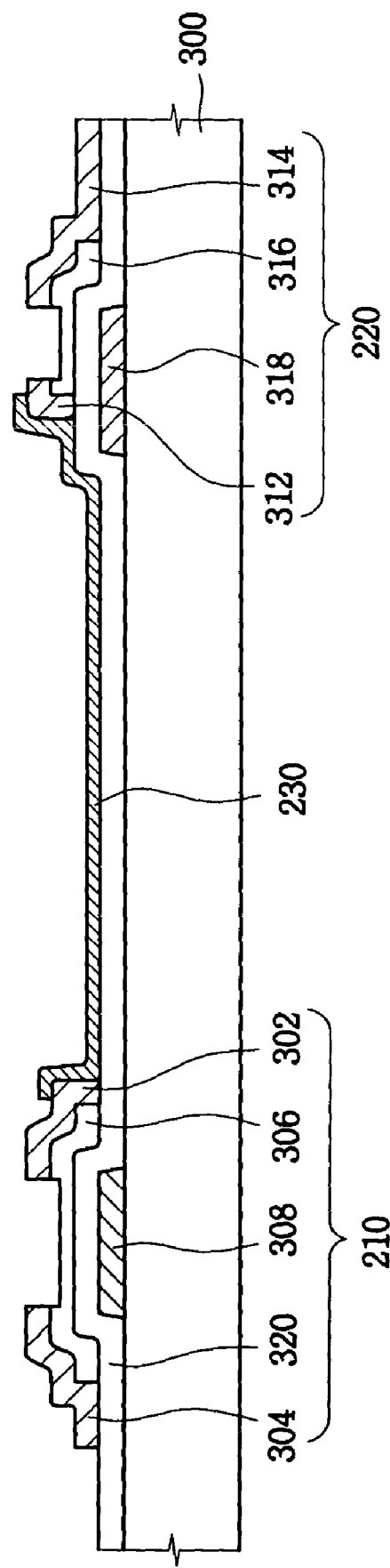

FIGS. 7A to 7C are views illustrating a method of fabricating the biological-signal recognition sensor of the fingerprint recognition apparatus according to an exemplary embodiment of the present invention.

Referring to FIG. 7A, a first metal layer (not shown) including aluminum (Al), chromium (Cr) or molybdenum-tungsten (MoW) is deposited on the transparent substrate 300 including glass, quartz or sapphire by a sputtering method. The first metal layer is patterned to form the gate electrodes 308 and 318 of the first and second TFTs 210 and 220.

The gate insulating layer 320 including silicon nitride (SiNx) is formed over the transparent substrate 300, on which the gate electrodes 308 and 318 are formed, by a PECVD (Plasma-Enhanced Chemical Vapor Deposition) method.

An amorphous silicon layer and an n$^+$ amorphous silicon layer are deposited on the gate insulating layer 320 by the PECVD method and patterned to form the first and second channel areas 306 and 316.

Referring to FIG. 7B, a second metal layer (not shown) including chromium is deposited over the transparent substrate 300 by the sputtering method. The second metal layer is patterned to form the source and drain electrodes 302 and 304 of the first TFT 210 and the source and drain electrodes 312 and 314 of the second TFT 220.

Referring to FIG. 7C, indium tin oxide is deposited over the transparent substrate 300 on which the first and second TFTs 210 and 220 are formed. The indium tin oxide is patterned to form the conductive sensing electrode 230. The conductive sensing electrode 230 electrically connects the source electrode 302 of the first TFT 210 and the source electrode 312 of the second TFT 220.

The protecting layer 330 (see FIG. 4) is formed over the transparent substrate 300 on which the conductive sensing electrode 230 is formed, thereby completing the biological-signal recognition sensor as shown in FIG. 4.

Figure 8:
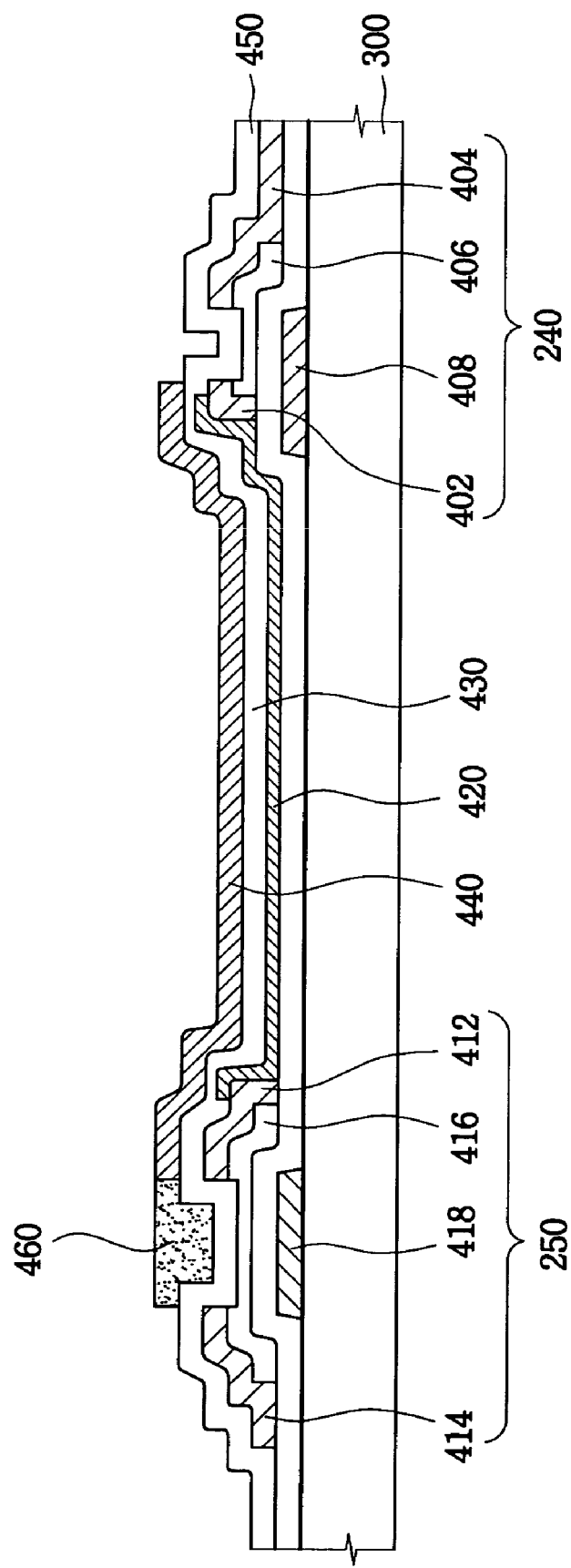
FIG. 8 is a cross-sectional view illustrating a method of fabricating a fingerprint recognition sensor of a fingerprint recognition apparatus according to an exemplary embodiment of the present invention.

FIG. 8 is a cross-sectional view illustrating a method of fabricating a fingerprint recognition sensor of a fingerprint recognition apparatus according to an exemplary embodiment of the present invention.

Referring to FIG. 8, the third and fourth TFTs 240 and 250 are formed on the transparent substrate 300 through processes same as in those for forming the first and second TFTs 210 and 220. Also, the first electrode 420 is formed on the transparent substrate 300 to electrically connect the source electrode 402 of the third TFT 240 to the source electrode 412 of the fourth TFT 250.

The insulating layer 430 including the silicon nitride is formed over the transparent substrate 300 on which the first electrode 420 is formed. The indium tin oxide is deposited on the insulating layer 430 and patterned to form the second electrode 440 corresponding to the first electrode 420. Thus, the storage capacitor Cst includes the first electrode 420, second electrode 440 and insulating layer 430. The first and second electrodes 420 and 440 act as the lower and upper substrates of the storage capacitor Cst, respectively.

The shielding layer 460 is formed on the insulating layer 430 corresponding to the fourth channel area 416 of the fourth TFT 250 by depositing chromium/chromium oxide (Cr/CrxOy) and patterning the chromium/chromium oxide (Cr/CrxOy). The protecting layer 470 (see FIG. 5) is formed over the transparent substrate 300 on which the shielding layer 460 is formed, thereby completing the fingerprint recognition sensor as shown in FIG. 5

The protecting layer 470 (see FIG. 5) formed over the third and fourth TFTs 240 and 250 is formed by same material and process as in those of the protecting layer 330 (see FIG. 4) formed over the first and second TFTs 210 and 220.

According to the present invention described above, the fingerprint recognition apparatus includes the fingerprint recognition sensor that recognizes the fingerprint image from the human finger using the photoelectric type sensor and the biological-signal recognition sensor that recognizes the biological signal from the human finger using the capacitance type sensor.

Thus, the fingerprint recognition apparatus may check that whether or not the fingerprint recognition signal recognized by the fingerprint recognition sensor is obtained from the human being with the biological-signal recognition sensor, to thereby recognize the fingerprint with high accuracy and improve reliability thereof.

In addition, no substrate is separately needed to form the biological-signal recognition sensor on the fingerprint recognition apparatus because the biological-signal recognition sensor and fingerprint recognition sensor may be formed on one transparent substrate as one array circuit, thereby improving a light transmittance of the fingerprint recognition apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An image recognition apparatus comprising:
    a transparent substrate;
    a first recognition section disposed on the transparent substrate, the first recognition section receiving an image pattern from an object and generating a first recognition signal corresponding to the received image pattern; and
    a second recognition section disposed on the transparent substrate adjacent to the first recognition section, the second recognition section having a conductive sensing electrode connected to a switching element, and sensing a biological signal from the object by measuring a capacitance between the object and the conductive sensing electrode so as to check whether or not the first recognition signal is obtained from a human being.

2. The apparatus of claim 1, wherein the first recognition section is disposed on a center portion of the transparent substrate and the second recognition section is disposed on a peripheral area surrounding the first recognition section.

3. The apparatus of claim 2, wherein the first recognition section comprises an image recognition sensor that generates the first recognition signal corresponding to an amount of a reflecting light reflected from the image pattern, the amount of the reflecting light being differently reflected according to a position from which the reflecting light is reflected.

4. The apparatus of claim 3, wherein the image recognition sensor comprises:
    a sensing thin film transistor (TFT) that outputs a voltage signal corresponding to the reflecting light reflected from the image pattern;
    a storage capacitor that charges an electron charge corresponding to the voltage signal input from the sensing TFT; and
    a switching TFT that outputs a voltage signal corresponding to the electron charge charged into the storage capacitor in response to a switching signal applied from an external.

5. The apparatus of claim 2, wherein the second recognition section comprises:
    a first biological-signal recognition section disposed on a first end portion of the transparent substrate, which is adjacent to the first recognition section; and
    a second biological-signal recognition section disposed on a second end portion of the transparent substrate, which is adjacent to the first recognition section and opposite to the first end portion.

6. The apparatus of claim 5, wherein the first and second biological-signal recognition sections comprise a capacitance type biological-signal recognition sensor that acts as a capacitor with the object having the image pattern.

7. The apparatus of claim 6, wherein the first and second biological-signal recognition sections act as a lower electrode of the capacitor and the object having the image pattern acts as an upper electrode of the capacitor.

8. The apparatus of claim 1, wherein the switching element of the biological-signal recognition sensor comprises:
    a first thin film transistor (TFT) that outputs a predetermined voltage signal to the conductive sensing electrode; and
    a second TFT electrically connected to the conductive sensing electrode, wherein
    the conductive sensing electrode charges an electron charge corresponding to the predetermined voltage signal from the first TFT and the second TFT outputs a voltage corresponding to the electron charge.

9. The apparatus of claim 1, wherein the image pattern of the object comprises a fingerprint image obtained from the human being.

10. The apparatus of claim 1, wherein the object directly makes contact with the transparent substrate.

11. An image recognition apparatus comprising:
    a plurality of sensing signal output lines disposed on a transparent substrate, extended in a first direction and arranged in a second direction substantially perpendicular to the first direction;
    a plurality of gate lines disposed on the transparent substrate, extended in the second direction and arranged in the first direction;
    a plurality of pixel areas defined by two sensing signal output lines adjacent to each other and two gate lines adjacent to each other;
    a first recognition section formed on the pixel areas positioned at a center portion of the transparent substrate, the first recognition section receiving an image pattern from an object that makes contact with the transparent substrate and generating a first recognition signal;
    a bias line extended in the first direction, arranged in the second direction and adjacent to the sensing signal output lines, the bias line applying a predetermined voltage signal to the first recognition section;
    a gate-off line extended in the second direction, arranged in the first direction and adjacent to the gate lines, the gate-off line outputting a gate-off signal to the first recognition section; and
    a second recognition section formed on the pixel areas adjacent to the first recognition section, the second recognition section sensing a biological signal from the object so as to check whether or not the first recognition signal is obtained from a human being.

12. The apparatus of claim 11, wherein the first recognition section comprises an image recognition sensor that generates the first recognition signal corresponding to an amount of a reflecting light reflected from the image pattern, the amount of the reflecting light being differently reflected according to a position from which the reflecting light is reflected.

13. The apparatus of claim 12, wherein the first recognition section comprises:
   a sensing thin film transistor (TFT) that outputs a voltage signal corresponding to the reflecting light reflected from the image pattern;
   a storage capacitor that charges an electron charge corresponding to the voltage signal input from the sensing TFT; and
   a switching TFT that outputs a voltage signal corresponding to the electron charge charged into the storage capacitor in response to a switching signal applied from an external.

14. The apparatus of claim 13, wherein the sensing TFT comprises:
   a drain electrode connected to the bias line;
   a gate electrode connected to the gate-off line; and
   a source electrode connected to the storage capacitor.

15. The apparatus of claim 13, wherein the switching TFT comprises:
   a gate electrode connected to an adjacent gate line;
   a drain electrode connected to an adjacent sensing signal output line; and
   a source electrode connected to the storage capacitor.

16. The apparatus of claim 11, wherein the second recognition section comprises:
   a first biological-signal recognition sensor disposed on a first end portion of the transparent substrate; and
   a second biological-signal recognition sensor disposed on a second end portion of the transparent substrate, which is opposite to the first end portion.

17. The apparatus of claim 16, wherein the first and second biological-signal recognition sensors comprise a capacitance type biological-signal recognition sensor that acts as a capacitor with the object having the image pattern.

18. The apparatus of claim 17, wherein the first and second biological-signal recognition sensors act as a lower electrode of the capacitor and the object having the image pattern acts as a upper electrode of the capacitor.

19. The apparatus of claim 17, wherein the biological-signal recognition sensor comprises:
   a first thin film transistor (TFT) that outputs a predetermined voltage signal;
   a conductive sensing electrode that acts as the capacitor with the upper electrode, the conductive sensing electrode charging an electron charge corresponding to the predetermined voltage signal from the first TFT; and
   a second TFT that outputs a voltage signal corresponding to the electron charge charged into the conductive sensing electrode.

20. The apparatus of claim 19, wherein the first TFT comprises:
   a gate electrode connected to an adjacent gate line;
   a drain electrode commonly connected to the gate line with the gate electrode; and
   a source electrode connected to the conductive sensing electrode.

21. The apparatus of claim 19, wherein the second TFT comprises:
   a gate electrode connected to an adjacent gate line;
   a drain electrode connected to the sensing signal output line; and
   a source electrode connected to the conductive sensing electrode.

22. The apparatus of claim 11, wherein the image pattern of the object comprises a fingerprint image obtained from the human being.

* * * * *